United States Patent
Albert et al.

(10) Patent No.: US 7,763,190 B2
(45) Date of Patent: Jul. 27, 2010

(54) LOW-COST TOUGH DECORATIVE PRINTABLE FILM PRODUCTS HAVING HOLOGRAPHIC-TYPE IMAGES

(75) Inventors: Timothy W. Albert, Dayton, OH (US); Robert C. Flaherty, Loves Park, IL (US)

(73) Assignee: Transilwrap Company, Inc., Franklin Park, IL (US)

( * ) Notice: Subject to any disclaimer, the term of this patent is extended or adjusted under 35 U.S.C. 154(b) by 1128 days.

(21) Appl. No.: 11/399,847

(22) Filed: Apr. 6, 2006

(65) Prior Publication Data
US 2006/0226563 A1   Oct. 12, 2006

Related U.S. Application Data

(60) Provisional application No. 60/669,221, filed on Apr. 7, 2005.

(51) Int. Cl.
*B29C 41/02* (2006.01)
*B32B 27/00* (2006.01)

(52) U.S. Cl. ............ 264/1.34; 264/172.19; 264/299; 156/231

(58) Field of Classification Search ............ 264/172.19, 264/299, 1.34; 156/230, 231, 246
See application file for complete search history.

(56) References Cited

U.S. PATENT DOCUMENTS

| | | | |
|---|---|---|---|
| 3,363,557 A | | 1/1968 | Blake |
| 3,663,155 A | * | 5/1972 | Gray et al. .................. 8/505 |
| 3,733,381 A | | 5/1973 | Willette et al. |
| 3,761,338 A | | 9/1973 | Ungar et al. |
| 3,829,286 A | | 8/1974 | Anzai et al. |
| 4,290,248 A | * | 9/1981 | Kemerer et al. ......... 52/309.16 |
| 4,395,263 A | * | 7/1983 | Davis ........................... 8/471 |
| 4,462,852 A | * | 7/1984 | Custor ........................ 156/231 |
| 4,738,949 A | | 4/1988 | Sethi et al. |
| 4,758,296 A | * | 7/1988 | McGrew ..................... 156/231 |
| 4,906,315 A | | 3/1990 | McGrew |
| 4,908,285 A | | 3/1990 | Kushibiki et al. |
| 4,923,848 A | | 5/1990 | Akada et al. |
| 5,011,570 A | | 4/1991 | Ohbayashi |
| 5,238,516 A | * | 8/1993 | van Suylekom et al. ..... 156/230 |
| 5,310,222 A | | 5/1994 | Chatwin et al. |

(Continued)

OTHER PUBLICATIONS www.spectratek.net/productlines/holographic/applications, "applications & converted films," Spactratek Technologies, Inc., Jul. 20, 2005 printout.

(Continued)

*Primary Examiner*—Matthew J. Daniels
(74) *Attorney, Agent, or Firm*—Cook Alex Ltd.

(57) ABSTRACT

Tough decorative printable film products having holographic-type images are provided that are low in cost. These film products include a relatively high temperature film that is made by continuous extrusion of the film resin onto a master film having pre-etched holographic-type imaging in order to provide a high-temperature primary film with conforming holographic imaging. This primary film provides a tough holographic-type image that is readily secured to any number of products to impart a holographic character to them. For example, this primary film is suitable for use on the surface of recreational sportsboards. When desired, sublimation printing can be used to impart indicia, text, images and colors, alone or in combination, to the primary film.

4 Claims, 1 Drawing Sheet

U.S. PATENT DOCUMENTS

| | | | |
|---|---|---|---|
| 5,344,808 A | 9/1994 | Watanabe et al. | |
| 5,411,783 A * | 5/1995 | Mahn, Jr. | 428/79 |
| 5,451,560 A | 9/1995 | Akada et al. | |
| 5,512,219 A * | 4/1996 | Rowland et al. | 264/1.6 |
| 5,580,410 A | 12/1996 | Johnston | |
| 5,599,765 A | 2/1997 | Ohshima et al. | |
| 5,629,259 A | 5/1997 | Akada et al. | |
| 5,707,925 A | 1/1998 | Akada et al. | |
| 5,900,095 A | 5/1999 | Stepanek | |
| 5,994,263 A | 11/1999 | Ohshima et al. | |
| 6,110,864 A | 8/2000 | Lu | |
| 6,256,146 B1 | 7/2001 | Merrill et al. | |
| 6,264,782 B1 | 7/2001 | Oshima et al. | |
| 6,344,297 B1 | 2/2002 | Burzynski et al. | |
| 6,368,684 B1 | 4/2002 | Onishi et al. | |
| 6,423,167 B1 | 7/2002 | Palmer et al. | |
| 6,489,266 B1 | 12/2002 | Kurokawa et al. | |
| 6,511,695 B1 | 1/2003 | Paquin et al. | |
| 6,632,507 B2 | 10/2003 | Benton et al. | |
| 6,692,879 B2 | 2/2004 | Suzuki et al. | |
| 6,828,274 B2 | 12/2004 | Onishi et al. | |
| 6,855,473 B2 | 2/2005 | Odamura et al. | |
| 6,905,774 B2 | 6/2005 | Takahashi et al. | |
| 2003/0124435 A1 | 7/2003 | Rich et al. | |
| 2004/0033423 A1 | 2/2004 | Burzynski et al. | |
| 2004/0053140 A1 | 3/2004 | Stadler et al. | |
| 2004/0101982 A1 | 5/2004 | Woontner | |
| 2004/0143914 A1 | 7/2004 | Flaherty | |
| 2004/0253521 A1 | 12/2004 | Otaki et al. | |
| 2005/0026081 A1 | 2/2005 | Kawamura | |

OTHER PUBLICATIONS www.screenweb.com/index/php/channel/5/id/1137, "Digital printing," Screen web, digital version of "Custom Decorating with Digital-Transfer Technology," Frecska (Jan. 8, 2004).

* cited by examiner

LOW-COST TOUGH DECORATIVE PRINTABLE FILM PRODUCTS HAVING HOLOGRAPHIC-TYPE IMAGES

CROSS-REFERENCE TO RELATED APPLICATION

Provisional patent application Ser. No. 60/669,221, filed Apr. 7, 2005, incorporated by reference hereinto.

FIELD OF THE INVENTION

The present invention is related to decorative film products that have holographic-type images and that are printable. More particularly, the invention relates to products of this type which provide a low-cost approach for providing such film products that are suitable for a variety of uses, including for uses that exert considerable wear and tear on the film, so as to be suitable for providing decorative enhancement to products including so-called recreational sportsboards.

BACKGROUND OF THE INVENTION

Traditional holographic films typically are made by a procedure summarized as follows. A substrate (such as an acrylic coated oriented polyester film) is coated with an embossable coating. This film is then passed across an etched roller under heat and pressure to emboss the coating. Typical embossment depths are a few angstroms to about 2 mils. A clear high refractive index material (typically indium tin oxide or zinc sulfide) or a metal (often aluminum) is applied to the embossed side to preserve the image integrity. Such holographic decorative films are commercially available under the trademark SPECTRATEK®, of Spectratek Technologies, Inc., as are other products from other sources. When desired, these can be available in the art without the high refractive index (HRI) material or aluminum having been applied to the embossed surface.

It will be appreciated in the art that these types of traditional holographic films essentially are films that have been embossed. Often in the art, a holographic embossed film includes at least one layer that reflects light at an angle different from other panels or portions of the surface having the embossment. These films can be said to have diffractive optical elements, jagged etch cuts, image-imparting prismal etching, micro-angled cuts, or prismal or holographic style effects. Such elements often give the embossed film refractive characteristics that typically vary with the angle and wave length of the light emitted onto the embossed surface. The terms holographic and embossed, when used herein, signify a surface that has embossed members or facets. While these embossed films or surfaces can exhibit the diffractive optical elements that often are labeled as holographic, a strict definition of holographic is not intended. Instead, such term refers to surfaces or films that have differing depth characteristics, that is they are embossed, whether or not the reflective angles are such as to fall within a strict definition of holographic.

Over the years, embossment approaches have been used to provide or enhance decorative and/or functional polymer film surfaces. These can include embossments that have strict holographic properties which often are considered desirable due to their unique and eye appealing and interest-generating aspects. Often, it is essential that such products exhibit an eye-catching character that can be imparted by high refractive index (HRI) materials by adding the materials or metals discussed above and that typically are applied as a clear or transparent layer onto the embossed areas of the film. While this is often successful in preserving image quality and surface integrity, it has come to be appreciated that holograms made in the traditional way described hereinabove are susceptible to weaknesses that can be manifested when such embossed films are to be included on products that are expected to be used under rugged conditions. Typical holographic or embossed films are not durable when subjected to harsh environmental conditions, particularly including repeated and forceful physical contact with rigid items, which often involves kinetic energy transfer upon contact between the holographic surface and such an item. These can take the form of impacts from rigid objects hurled onto the surface or objects that, due to the nature of the holographically decorated product constantly engage and impart forces into the surface.

Weaknesses in these instances can include the following. HRI coatings and adhesive layers used in such traditional holographic films can exhibit low thermal stability, making them vulnerable to higher processing temperatures and to environmental degradation, such as would be encountered in outdoor use. In addition, material breaks occur at interfaces, particularly when overlayer barriers are used when the product is intended for rugged applications. Metallized top layers, for example, which can also impart added reflectance and a metallic look, can experience breaks due to relatively weak bonds at layer interfaces. Particularly problematic in this regard are material breaks at interfaces between metallized layers and layers of other materials or films.

Accordingly, in the art, it is generally understood that decorative embossings and holograms cannot be used on products that are intended for rugged end use. This is because the holograms will split apart and compromise the construction of the product. The art would generally believe that standard hologram approaches would split if the material were exposed to situations under which substantial stress and/or impact is imparted repeatedly. Accordingly, there is a need for an approach that addresses these concerns and provides a durable approach for applying decorative embossed surfaces onto products that will avoid these types of splitting and separation concerns.

Often, it is further desired that decorative surfaces that have holographic or embossed characteristics also have images applied to the surface. Typically, images would be applied by printing, inking or dyeing techniques. One problem that is recognized with holographic or embossed surfaces is that many printing, inking and dyeing techniques obscure the embossed or holographic effect. It is believed that this can be caused by the inking media filling several or all of the embossment depressions. This can be referred to as "wetting out" or "clearing" the holographic imagery. It will be appreciated that filling or coating some or all of the depressions changes the reflectance of the hologram or embossment. Conventional printing techniques, such as those using conventional inks include offset, flexographic and lithographic technologies, experience this "wetting out."

While it has been generally appreciated that dye sublimation imprinting is a useful means of direct image transfer, prior publications such as Flaherty, U.S. Patent Publication No. 2004/0143914 do not teach how to use dye sublimation technology in a manner that is suitable for low-cost rugged use. For example, the Flaherty publication describes a laminate having a frangible hologram embedded therein, while providing a surface that is receptive to dye sublimation direct image transfer.

Benton et al., U.S. Pat. No. 6,632,507 discusses holographically enhanced decorative laminates, teaching heat and pressure embossing lamination. This describes a laminate sheet assembly having a polypropylene-based release sheet that, upon the application of heat and pressure, transfers a holographic image onto an overlay layer of the laminate for application to a rigid substrate such as plywood, particle board, chip board and medium density fiberboard. By this approach, the polypropylene-based sheet containing the holographic image functions as a release sheet for conventional decorative laminate lay-ups having the overlay layer, a pattern layer and a core layer which is composed of one or more layers of phenolic resin impregnated craft paper. The overlay layer is said to include aluminum oxide for wear resistance. While this patent is intended for application to rigid substrates and for rugged use such as countertops, flooring panels and wall panels, this is accomplished in a somewhat traditional manner of using laminate sheet assembly onto which a holographic image is impressed by heat and pressure into an overlay layer to which a wear coating is applied after the holographic image is formed thereon.

Another approach which incorporates transfer of physical embossment of a holographic image is illustrated by Stepanek, U.S. Pat. No. 5,900,095. This encompasses, for example, a transfer of a holographic image from a polymeric support to a tissue paper substrate. This patent and all other patents, references and publications identified herein are incorporated hereinto by reference.

Prior approaches such as these require somewhat complicated means for imparting embossed or holographic images. While some of this art discusses relatively rugged uses, this can increase complexity according to the solutions given by this prior art. They are also not described as being particularly well suited for combining holographic technology with printing, inking or dying in order to impart indicia, wording, images or other decorative or informative elements, typically when combined with multiple color displays. Accordingly, the art does not provide an approach by which holographic features can be employed in a low-cost manner that is advantageously straight forward and is well-suited to rugged uses including for recreational sportsboards, as well as other uses where simplicity and durability are assets. Further needs are appreciated where one wishes to combine a holographic or embossed feature with a printing, inking or dying feature, particularly one in which the holographic type feature and the additional decorative features are simultaneously visible on the product.

SUMMARY OF THE INVENTION

The present invention employs holographic or embossed features from the embossed film of holographic sheeting systems that are not particularly suitable for rugged uses. This embossed film is totally separated from the rest of the sheeting system to provide a master having the desired embossed pattern. Molten polymer is extruded onto the master embossed film, thereby filling in the embossed depressions. Upon cooling, the extruded polymer forms a reverse-imaged film, which film is of a polymer that is hard and durable and is a sublimation dye-receptive polymer. This is the primary film that is viable on its own and can be marketed to manufacturers of products including those where durability in the face of rugged use is essential.

In a preferred embodiment, this primary film has sublimable dye, typically in a combination of images, text or other indicia, often in multiple colors, applied to the primary film chemically absorbed into the polymer of the primary film, thereby combining the holographic-like feature and the dye feature to provide a product having dye images and varied holographic attributes visible simultaneously.

In a further embodiment, a backing is applied to the primary film on the side opposite to the embossed imagery, typically after sublimation dye treatment. This backing is suitable for applying the primary film to a component that is to be decorated with holographic properties, such as a recreational sportsboard.

A general aspect or object of the present invention is to provide a primary film having embossed holographic or holographic-like patterns and made of hard and durable polymer material that is sublimation dye-receptive.

Another aspect or object of this invention is to provide a product having a durable hologram-containing polymer sheet that is sublimation dye printed and that exhibits both holographic and printed properties simultaneously in the same locations, giving the appearance of a holographic image contained within a printed area.

Another aspect or object of the present invention is to provide recreational sportsboards and other products having similar properties that are hard and durable and that exhibit hard and durable holographic and printed characteristics simultaneously on the visible surface of the product.

Another aspect or object of this invention is directed to a thermoplastic film having an embossed holographic image on a surface thereof, which surface is adapted to receive gaseous phase dye diffusion printing applied directly thereon.

Another aspect or object of this invention is a thermoplastic film having a holographic image which can be incorporated into products subjected to high impact use.

Another aspect or object of this invention is a process for embossing a holographic image on durable thermoplastic materials using a selected layer from commercially available holographic decorative film sheeting as the master.

Yet another aspect or object of this invention is an embossed profile sheet for packaging which is not removable, does not result in curling of the packaging and receives gaseous phase dry diffusion printing that does not obscure the holographic-type image.

Other aspects, objects and advantages of the present invention will be understood from the following description according to the preferred embodiments of the present invention, specifically including stated and unstated combinations of the various features which are described herein, relevant information concerning which is shown in the accompanying drawings.

DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
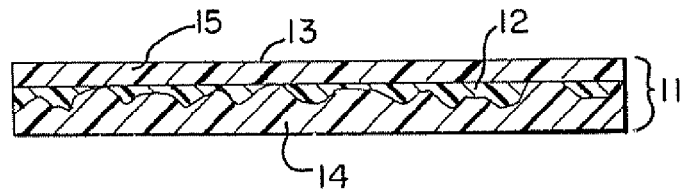
FIG. 1 is a schematic illustration in cross-section depicting a portion of a prior art holographic film product having an embossed prismatic holographic image thereon.

FIG. 1 illustrates a typical roll of holographic decorative film sheeting, generally designated at 11. Shown is a high refractive index (HRI) coating 12 that fills jagged etch cuts 13 that are embossed into a base film 14 of the sheeting 11. A metallized top layer 15 is shown over the HRI coating. This top layer typically is metallized and contributes reflectance and a metallic look to the sheeting. The HRI coating protects the etched image and allows light transmission in order to facilitate any desired holographic effect. Illustrated sheeting 11 is typical of prior art holographic-type sheeting systems that are available in the art.

Figure 2:
FIG. 2 is a schematic illustration in cross-section of the base film of the product of FIG. 1 which has the embossed image.

The present invention employs base film sheeting 14 from products such as sheeting system 11. Alternatively, it can be possible to produce or obtain such an embossed or holographic base film 14. Such base films 14 (FIG. 2) are made of embossable material to which a hologram pattern is applied in order to form the jagged etch cuts 13 or other styles of embossment. Not only is the base film sheeting embossable, but it also must be suitable for extrusion of a polymer thereover to form the primary film discussed herein. The base film sheeting may be a coextrusion. The base film sheeting must be made of a polymer and/or coextrusion that is heat resistant to melting or distorting at the temperature of the extrudate when it touches the base film, and its melt temperature should exceed the temperature of the polymer from the extruder at the time the extruded polymer contacts the base film sheeting.

Typically, the embossable material out of which the base film 14 is made includes an oriented film such as a biaxially oriented film stretched in two dimensions. Preferred is oriented PET, or oPET. Other materials for this can include those of commercial holographic or embossed sheeting such as SPECTRATEK® sheeting or other known sheetings that have the characteristics required herein. Typically, these polymers will have a minimum melting point or melt temperature of at least about 150° C., preferably at least about 160° C. (320° F.), more preferably at least about 175° C. (350° F.). Generally, it is important that the Tm value and Tg value or values be high enough that the sheeting that is used as the base film 14 be able to maintain the integrity of its embossed or holographic character.

This base film 14 can be a coextrusion of the aforementioned material such as oPET and an overlayer that has exceptional initial embossing receiving characteristics. Such a layer can be amorphous. A suitable non-crystalline polymer is a relatively soft polyester in the polyethylene terephthalate (PET family). Amorphous PET film molecules are not aligned or ordered within the material. Materials such as these are well-suited to accept and retain embossing patterns, including jagged edge cuts and prismal etching with micro-angled cuts typical of holographic embossments, while also exhibiting good lamination properties. Amorphous PET itself has a moderate-to-low temperature stability range of about 60° C. to about 70° C. (about 140° F. to about 158° F.).

Figure 3:
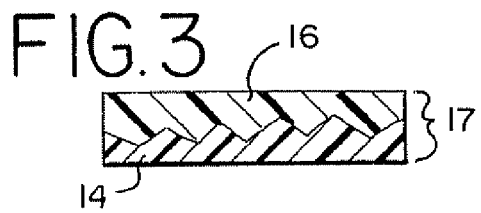
FIG. 3 is a schematic illustration in cross-section of the film of FIG. 2 shown being used as a master that has been extrusion coated with a high-temperature sublimation dye receptive polymer material.
Figure 4:
FIG. 4 is a schematic illustration in cross-section of the extruded polymer shown in FIG. 3 after removal of the base film of FIG. 2 in order to provide a tough decorative primary film having an inverse holographic image embossed on a surface of this decorative primary film.

This invention takes the embossed sheeting roll of holographic decorative base film 14 and uses that embossed film as a master to emboss hot molten polymer through an extrusion process to form a combination of films 14 and 16, generally designated as 17 in FIG. 3. Once cooled, the holographic decorative base film sheeting 14 is removed from the combination 17 to provide the resulting extruded polymer primary film 16 (FIG. 4). The separated base film sheeting master 14 usually can be reused to further lower cost.

If desired, the film 14 could be left on the primary film 16. In that case the combination that is generally designated 17 in FIG. 3 can be used as a "peel and reveal" product. This effect is due primarily to there being no net angle of holographic or embossed reflection while the films 14 and 16 are ultimately conformed in mirror image to one another. With such a product 17, the holographic or embossed image is not visible. Thus, until the base film 14 and the primary film 16 are separated or "peeled" from each other, the holographic or embossed image is not visible under unaided viewing. The images are revealed upon separation. This provides a useful way of storing or shipping the primary film 16 in order to provide extra protection therefor until after same is ready for use.

Alternatively, the primary film 16 can be provided in this "peel and reveal" form and used in this form while being further processed into final products. At an appropriate stage, the base film 14 is removed to reveal the holographic image and proceed with further processing, including but not limited to processing into recreational sportsboards and other products as discussed elsewhere herein.

In keeping with many preferred embodiments of the invention, the extruded polymer primary film 16 having the holographic or other embossed image thereon, is made of a polymer suitable for the objectives of this film. More specifically, polymer out of which the primary film 16 is made has good toughness and a relatively high melting point and/or glass transition temperature. The extruded polymer primary film 16 exhibits heat resistance that is high enough to avoid melting or distorting of the embossed facets being formed or already formed therein, including when at the temperature of the extrudate of this polymer when it touches the base film 14 to form the product 17 of FIG. 3. Generally, this is to be achievable when using base film 14 in which the highest melting point polymer has a melting point (Tm) of at least about 175° C. (about 350° F.) as measured by ASTM Test Method D-3418. An instrument such as a DSC7 differential scanning calorimeter commonly is used.

The extrudate that forms the primary film 16 will be of a polymer having a similar Tm of at least about 175° C. (about 350° F.). Preferably the Tm of primary film 16 is at least about 200° C. (about 418° F.), and as high as at least about 220° C. (about 430° F.). In particular situations, the Tm could be as low as about 160° C. (320° F.). For example, it may be possible for some dye sublimation to occur at a temperature this low. This polymer also is hard and durable enough for sportsboard and other rugged uses, as may be desired, without additional coatings. The polymer also is suitable for high-speed continuous rolled film manufacture.

Thermoplastic materials that are suitable as the coating or extruded polymer primary film 16 for one or more of the embodiments include the following: polybutylene terephalate (PBT), high impact polystyrene (HIPS), polystyrene, high melting point polyolefins, polypropylene, polyethylene, polyethylene terephalate-glycol (PET-G), polytrimethylene terephthalate, polyethyl vinylacetate copolymer (EVA), polyethyl ethyl acrylate copolymer (EEA), polyethyl methyl acrylate (EMA). Other thermoplastic materials that are believed to be suitable as the coating or extruded polymer primary film 16 include the following: polycarbonate (PC), polyurethane (PU), polyvinyl chloride (PVC), acrylic resins, nylons, and acrylonitrile butadiene styrene (ABS) resin. Suitable thermoset materials, or the softer and/or lower softening and/or higher Tm thermoplastics, typically would need to be cross-linked after its separation from the holographic decorative film or base film or master 14.

Also, the polymers of the extruded film 16 should not be classified as having strong adhesive characteristics. Such polymers provide for much easier release properties, for example from the base film sheeting 14. Higher Tm and higher softening polymers tend to exhibit the desirable lower adhesive properties.

Further details concerning thermoplastic polymers that are suitable for the primary film 16 include the following. An example of a PBT polymer that is suitable is ULTRADUR 4500 (available from BASF). This has a melting temperature (Tm) range of between 218 and 231° C., and average melt temperature of about 223° C., an average glass transition temperature (Tg) of about 66° C. and a heat deflection at 66 PSI of about 164° C. A particular polyethylene terephalate type of polymer (oPET) has a melt temperature (Tm) range of about 180 to 270° C., usually between about 246 and 265° C. A typical polyamide or "nylon" has a Tm range of about 190 to 265° C., typically between about 210 and 230° C. A polyurethane (X 1014, available from Noveon) has a Tm range of from about 180 to 230° C., a Vicat softening point (measured according to ASTM Test Method D-1525) of 155° C., and a Tg range of from about 120° to 160° C. (Perken Elmer). A suitable modified polyester (Crystar 4-1621) has a Tm of about 220° C. and a Tg of about 70° C. The Tg values are as determined by ASTM Test Method E-1356. A DSC7 also is useful for this measurement.

Furthermore, in a preferred embodiment, the polymer of the extruded primary film has excellent hardness and durability properties and inherently accepts dye sublimation printing. Such polymers provide a good dye receiver substrate and are good sublimation dye-receptive polymers. Such polymers are chemically receptive and reactive with sublimation dyes. According to this aspect of the invention, sublimation dyes attach especially well to polyester-based polymers, binding the dye while in its gaseous form.

High temperature resins referenced specifically for dye sublimation printing must be able to withstand temperatures associated with sublimation printing, typically about 171-204° C. (about 340-400° F.) or greater without a substantial material distortion resulting. Thus, the resin must remain a solid and not become tacky or flow during the printing process. This technique is not intended to be limited to thermoplastic materials. Appropriate thermoset resins may also be used in sublimation printing, and are often adequately thermally resistant. Thermoplastic polymers especially suitable for dye sublimation printing include a polyester, polybutylene terephthalate, polytrimethylene terephalate, acrylics, nylons, polyurethanes, and combinations thereof.

Figure 5:
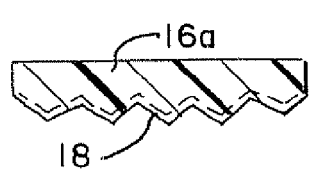
FIG. 5 is a schematic, cross-sectional illustration depicting a pattern of heated gaseous-phase sublimation ink applied to portions of the prismatic surfaces of the inverse holographic image of the FIG. 4 decorative primary film to form a printed image sublimated into the holographic image and below the surface of the primary film.

With further reference to the use of sublimation dyes on these types of polymers, a surface penetration phenomenon is observed. This phenomenon allows for graphics, text, indicia and/or colors to be placed on the target material surface without the printing profile interfering with the holographic-type feature. This aspect allows for complete retention of the holographic-type surface characteristics that are embossed into the base film 14 and transferred to the primary film 16 by the extrusion process while adding the decorative features of sublimation dye printing. This forms the decorated primary film 16a having dye 18 (FIG. 5).

Although not wishing to be bound by any theory, a dye sublimation mechanism that is believed to be followed with this aspect of the invention can be summarized in the following manner with respect to polyesters. A typical polyester molecule breaks open at about 163° C. (325° F.). This effects chemical bonding of the polyester to the heated sublimation dye. After cooling, the polyester molecules close, thereby permanently binding the dye in place and avoiding dye migration. During dye diffusion printing, the dye thus sublimates below the surface of the substrate or film and does not destroy the embossed pattern, such as by filling in any portion of a holographic pattern. The hologram-like pattern remains visible in both printed and unprinted areas. This can be considered to be a form of "chemical coloring."

With further reference to printed embodiments, the extruded polymer tough and relatively high melting primary film 16a bearing a holographic image can be printed by dye diffusion transfer directly on the holographic image without an interim treatment to increase refraction. The embossed surface on the extruded polymer has a holographic image that is visible in both printed and unprinted areas of the polymer surface after printing by the dye diffusion transfer.

Figure 5A:
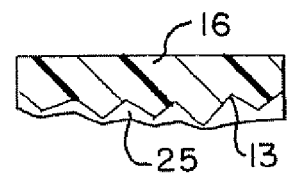
FIG. 5a is a schematic, cross-sectional illustration depicting a pattern of conventionally printed ink applied to portions of the prismatic surfaces of the inverse holographic image of the FIG. 4 decorative primary film to form a printed image which can cover and hide the embossed holographic effect of the primary film in said printed area.

FIG. 5a illustrates an approach where the primary film 16 is conventionally printed. This includes a conventional ink filling in jagged etch cuts 13, as indicated at 25.

A typical method for manufacturing products according to the invention on an industrial scale includes the following. A roll of holographic base film 14 with a resistance to deformation to heat greater than about 350° F. (175° C.) can be provided. This roll is embossed with a holographic-like image but does not have a coating of a high refractive index (HRI) coating or metallized layer. The roll of holographic base film is coated with a polymer, typically a thermoplastic material, through an extrusion process on the embossed side. Suitable rolls of holographic image receiving base films can be purchased from holographic film manufacturers and/or suppliers such as Crown Roll Leaf, Inc., Spectratek Technologies, Inc., or Holosource.

The holographic base film is mounted on the primary, secondary, auxiliary, or foil unwind locations of a commercial line. Usually, the film is not treated by traditional means that would typically create a greater bond between its base substrate film 14 and the extrudate formed into the primary film 16. Such traditional treatment includes but is not limited to primers, corona treatment, flame treatment, or ozone exposure. However, if premature release occurs between the base substrate film 14 and the extruded polymer, some level of corona or flame treatment may be desirable and enough to allow the holographic film to continue through the operation without prematurely releasing from the extruded polymer.

The holographic base film master should have enough heat resistance to avoid distortion or melting at the temperature to which the extrudate has cooled when it touches the film. As a rule of thumb, the extrudate will cool from about 50° to about 100° F. through the air gap. As a result, the temperature at the lamination station will be the melt temperature minus about 50 F. degrees (as a maximum). While the chill rollers will immediately pull the heat from the molten polymer, it is important to avoid too high a temperature at the film extrudate interface to avoid distorting or destroying the embossed pattern or bonding the base film master to the extruded plastic. The cooled product 17 coming off the chilled rolls will not appear to have any embossed design present. When the film is removed, the embossed pattern will reveal it self. Such peeling to reveal can be a subsequent step during in-line production such as of the primary film 16, or this revealing can occur when an ultimate product is made, such as a sportsboard. In an optional approach, the peel and reveal could be done by the ultimate consumer on suitable products.

It will be appreciated that this method leaves an inverse image on the primary film 16 from the original hologram exposed on the base substrate film 14. This does open up opportunity to create duplicate holographic images. In addition, after peeling from the base 14, the embossed primary film 16 is not protected by another coating and therefore oils or other substances can fill in the embossed pattern, effectively making it disappear. However, in most cases a washing with mild soap and water will remove the contaminants and restore the product to its original form before proceeding with subsequent operation, such as dye sublimation printing.

As previously noted, the invention is particularly well suited as an intermediate in the manufacture of various products. The invention is well suited for incorporation to products intended for rugged use where holograms traditionally are not suitable for long-term use because the multiple components of a traditional hologram product are susceptible to splitting apart during hard use. Products made according to the invention embody holographic or embossed substrates that are devoid of weak layers. The result is a rugged product having holographic-style effects and, if desired, co-existing printed art work which does not interfere with visual aspects of the holographic effects.

Examples of rugged products include recreational sportsboard substrates. Such substrates can be principal components of recreational products such as snowboards, wakeboards, boogieboards, kneelboards, snow skis, water skis, skateboards and so forth.

The extruded polymer primary film 16 can itself be a product of commerce. For example, such a product would be sold by a film manufacturer to a manufacturer of products in need of a holographic-style decorative finishes that have good durability. The latter manufacturers could be of bulky devices such as the recreational sportsboards noted herein, for consumer goods such as housewares, for vehicle accessories, signage, toys and so forth.

Figure 6:
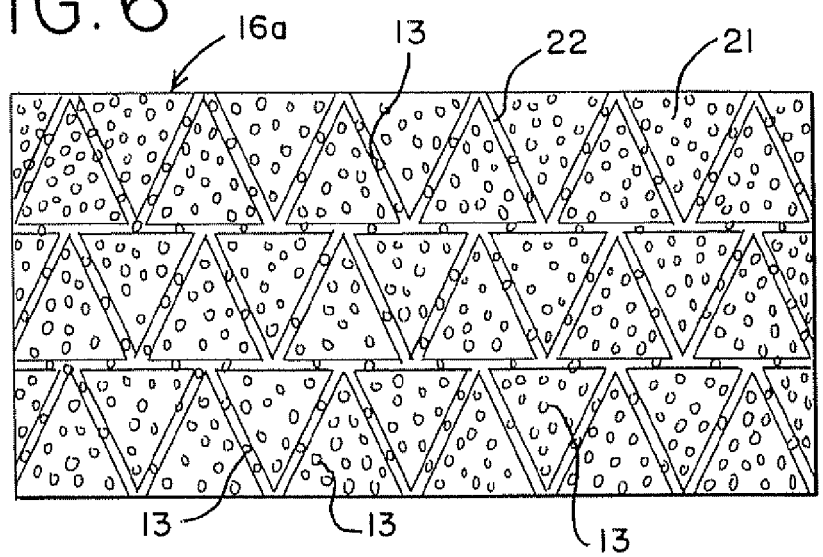
FIG. 6 is a top plan view of the sublimation inked product of FIG. 5 showing the holographic image visible in both inked and uninked areas.

A typical intermediate product is exemplified by the sublimation inked product of FIG. 5 and the conventionally printed product of FIG. 5a, which could be suitable for sale as an intermediate product used in making ultimate products of the type discussed herein. An extruded polymer primary film 16a has sublimation dye printing beneath its surface, thereby achieving the non-obscuring advantage. Jagged etch cuts 13 are visible throughout the surface of the product as it is shown in FIG. 6. This includes within printed areas 21 and unprinted areas 22.

Figure 7:
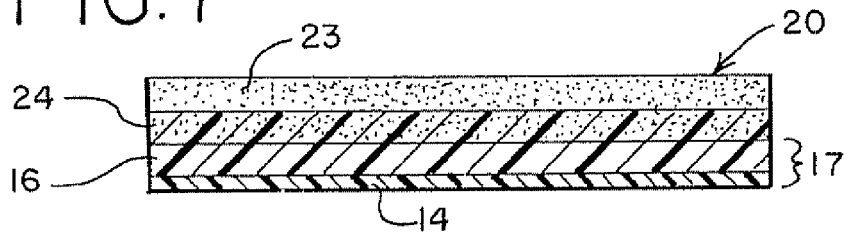
FIG. 7 is a schematic, cross-sectional illustration of one of these holographic image embossed sublimation printed decorative primary films laminated to a base layer of porous nonwoven fleece by an intermediate layer of interlocked nonwoven fleece and thermoplastic material, such being suitable for imparting a decorative surface to the face of a sportsboard.

FIG. 7 illustrates an intermediate product, generally designated as 20, that is especially well suited for recreational sportsboard use. In this instance, the base holographic-style film 14 remains positioned over the extruded polymer primary film 16, thereby obscuring the holographic characteristics such as the embossed jagged etch cuts. In addition, backing material suitable for appropriate bonding to sportsboards and the like is included in the product 20 depicted in FIG. 7. In essence, the backing is a layer of porous non-woven fleece 23 secured to the extruded primary film 16, in this instance through a thickness 24 of interlocking fleece and extruded polymer of the primary film 16. The makeup of a fleece backing is generally known in the art, as is its suitability for attaching to sportsboards.

Examples now are provided in order to illustrate the concepts of the invention with a certain degree of specificity.

EXAMPLE 1

Sportsboard substrates (used in the manufacture of snowboards, wakeboards, boogie boards, kneeboards, snow skis, and water skis) are prepared from materials that include PBT, ABS, ultra high molecular weight polyethylene and nylon. These materials are chosen for their durability as well as for the ability to be sublimation dye diffusion printed. These materials then are bound to a non-woven material on the backside in order to allow bonding sites for fiberglass through a manual lay-up operation. In this Example, the non-woven material used is an 8 mil. type, namely DuPont SONTARA® brand non-woven stock.

In one embodiment, an 8 to 9 mil. extruded PBT primary substrate 16 is capped with an image bearing holographic base film 14, and these are separated when desired. The holographic film is identified by the "Deep Groove" trade name, 2 mils. thick sold under the trademark Spectratek® of Spectratek Technologies, Inc. This results in providing a holographic image that resides on the principal surface of the board substrate. During the dye diffusion printing operation, the print sublimates below the prismatic surfaces of the holographic image and does not obscure the embossed pattern that had been formed on the PBT substrate. This leaves the holographic image visible in both the printed and unprinted areas of the PBT surface. The substrate having the holographic image thus obtained is suitable for use in high impact, temperature resilient applications such as snowboards in which conventional holographic images would fail because of their frangible nature particularly due to the high refraction index (HRI) treatment applied to conventional holographic images, which the present invention recognizes results in a weak metal interface that can separate from holographic images applied to substrates that are subject to rugged uses.

EXAMPLE 2

Profile sheets are products that can be sold as intermediates to manufacturers wishing to add holographic character or decoration to items they manufacture by having profile sheet products have a holographic film capped on the top of the product to attract attention to the product or printed piece. These are manufactured either in-line with an adhesive coated holographic film or off-line through a wet or thermal lamination process. There are shortcomings with this method. The holographic film ultimately can be removed from the substrate it was attached to, which is an undesirable feature. Also, the differences in thermal expansion coefficients between the film and the substrate can result in some curling of the finished product if this is done through a thermal process.

According to this Example, a commercially available holographic film of the type described herein (such as a SPEC- TRATEK® film) is capped to a HIPS sheet and removed. Once the holographic film is removed, this primary surface of the HIPS sheet is subjected to a high discharge electric corona to increase the surface energy and allow for conventional printing. The product is printed via screen, flexographic, lithographic, and any other ink depositing methods known in the industry. When dye diffusion thermal printing is not the printing of choice, the inks are not transparent and will fill in the embossed pattern. This Example results in the holographic image being visible in only the unprinted or uncoated areas. This approach is best suited for printed pieces that will not be excessively handled as contaminants will also fill in the embossed pattern and obscure the holographic image. For many such contaminants, this can be restored through washing with mild soap and water in most cases. Alternatively, the base layer can remain to preclude such contamination, leaving it to the user peel it off to reveal the embossed image.

When the embossing and conventional printing processes are used to make a profile sheet stock for sale as an intermediate or component for manufacturers wishing to add a holographic character or decoration to items they manufacture, the profile sheet with or without the base layer obscuring the embossing can be sold as this type of intermediate. Also, the HIPS can be replaced by or combined with a different high temperature resin, as noted elsewhere herein.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein.

The invention claimed is:

1. A method for manufacturing a holographic-style film for application to products to impart holographic-style decoration thereto, comprising:
    providing a polymeric master film having images that are embossed to exhibit a plurality of differing depth characteristics that reflect light at differing angles;
    extruding a molten primary film polymer onto the polymeric master film and onto its embossed images without distorting the master film and its embossed images;
    allowing the molten polymer to cool into an extruded primary film, said extruded primary film polymer facilitating formation of image embossments on a face of the primary film to provide a combination film comprising the primary film with said image embossments and the polymeric master film joined together, the extruded primary film image embossments being an inverse image of the embossed images of the polymeric master film;
    applying the combination film to a product;
    separating the master film and the extruded polymeric primary film with its image embossments, the extruded primary film being a holographic-style film having an embossed face and that is suitable for application onto a product to be given holographic-style decoration, wherein said separating is carried out after the combination film is applied onto the product; and
    sublimation dye treating the embossed face of the extruded polymeric primary film with a sublimation dye printing pattern thereby chemically absorbing the printing pattern into and below the surface of the image embossments of the polymeric primary film such that the printing pattern does not obscure the image embossments, whereby the printing pattern and image embossments are simultaneously visible at identical locations on the embossed face.

2. The method according to claim 1, further including applying a backing to the extruded polymeric primary film at a location other than its said embossed face to provide a backed holographic-style laminate for application to a rugged-use product.

3. The method according to claim 1, wherein the sublimation dye treating is gaseous phase diffusion dye printing, the printing pattern is a decorative pattern, further including applying a backing to a surface opposite of the embossed face to provide a backed holographic-style laminate of the combination file and backing, whereby the applying step applies the laminate to a rugged use product.

4. A method for manufacturing a recreational sportsboard having a holographic-style film on a surface thereof, comprising:
    providing a polymeric master film having images that are embossed to exhibit a plurality of differing depth characteristics that reflect light at differing angles;
    extruding a molten primary film polymer onto the polymeric master film and onto its embossed images without distorting the master film and its embossed images;
    allowing the molten polymer to cool into a primary film to provide a combination film comprising the primary film and the master film joined together, said primary film polymer facilitating formation of image embossments on a face of the primary film, the primary film image embossments being an inverse image of the embossed images of the polymeric master film;
    applying a backing to a surface opposite of the embossed face to provide a backed laminate for application to the sportsboard product and that simultaneously displays at identical locations the decorative pattern and the image embossments of the polymeric primary film;
    applying the rugged holographic-style film backed laminate to the surface of a recreational sportsboard product;
    separating the combination film into the master film and the extruded polymeric primary film with the image embossments, the primary film being a rugged holographic-style film;
    gaseous phase diffusion dye treating of the embossed face of the polymeric primary film with a decorative pattern thereby chemically absorbing the decorative pattern into and below the surface of the image embossments of the polymeric primary film such that the decorative pattern does not obscure the image embossments whereby the decorative pattern and image embossments are simultaneously visible at identical locations on the embossed face; and
    wherein said separating is carried out after the combined film is applied onto the sportsboard product.

* * * * *